S. MEREDITH, C. W. HOLLAND, L. J. O'BRIEN & C. C. McHENRY.
GLASS DRAWING POT.
APPLICATION FILED MAY 25, 1917.
1,279,569.
Patented Sept. 24, 1918.
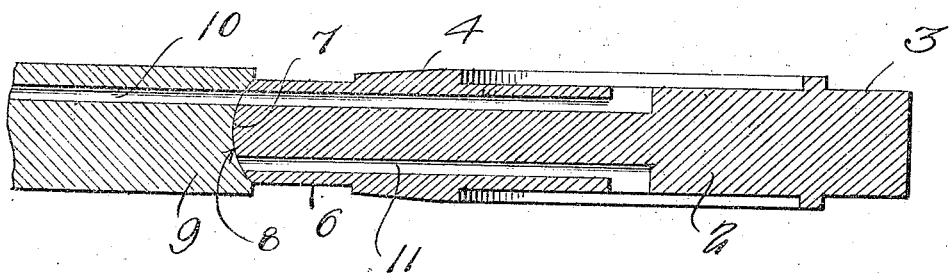
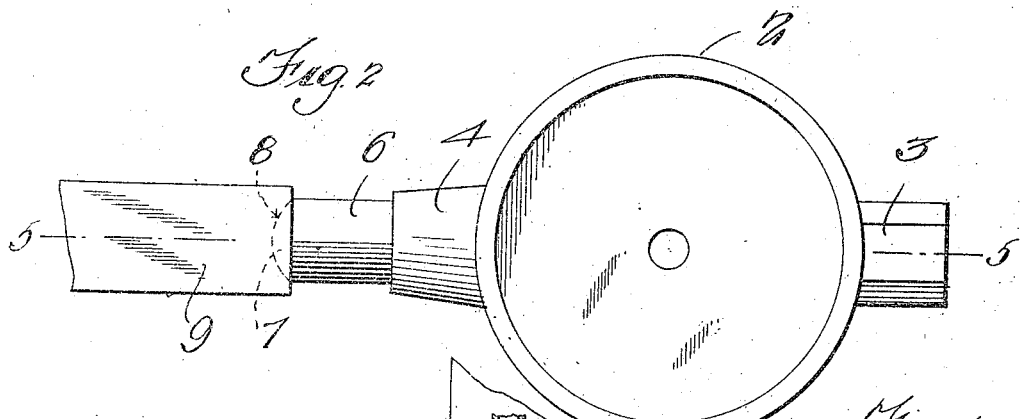
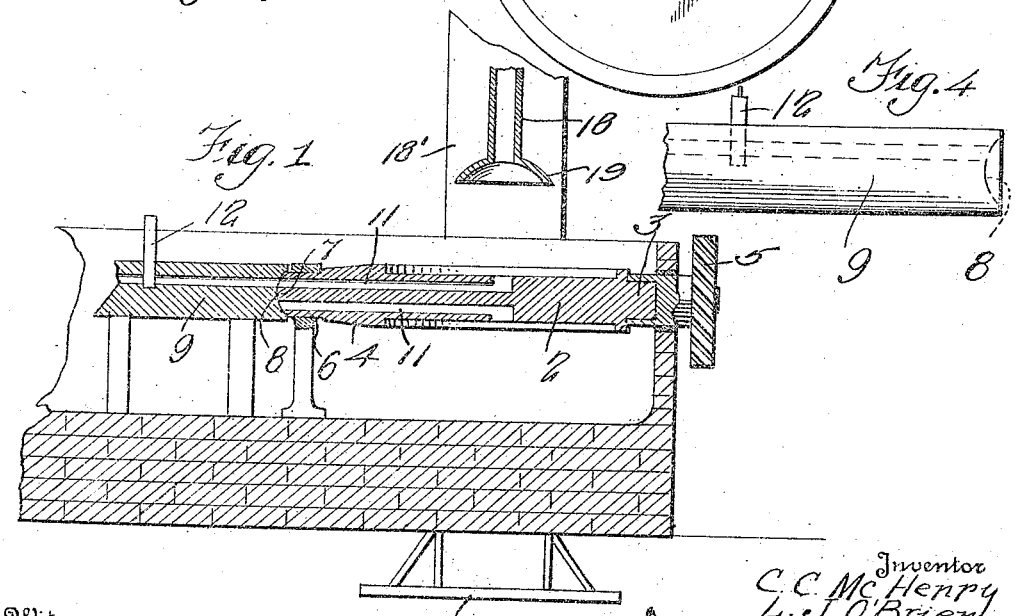
Witnesses
Inventor
C. C. McHenry
L. J. O'Brien
C. W. Holland
S. Meredith

UNITED STATES PATENT OFFICE.

STANLEY MEREDITH, OF CLARKSBURG, WEST VIRGINIA, AND CLIFFORD W. HOLLAND, OF JEANNETTE, LOUIS J. O'BRIEN, OF JOHNSTOWN, AND CHARLES C. McHENRY, OF JEANNETTE, PENNSYLVANIA.

GLASS-DRAWING POT.

1,279,569.

Specification of Letters Patent. Patented Sept. 24, 1918.

Application filed May 25, 1917. Serial No. 171,013.

*To all whom it may concern:*

Be it known that we, STANLEY MEREDITH, residing at Clarksburg, in the county of Harrison, State of West Virginia, CLIFFORD W. HOLLAND, residing at Jeannette, in the county of Westmoreland, State of Pennsylvania, LOUIS J. O'BRIEN, residing at Johnstown, in the county of Cambria, State of Pennsylvania, and CHARLES C. McHENRY, residing at Jeannette, in the county of Westmoreland, State of Pennsylvania, citizens of the United States, have invented certain new and useful Improvements in Glass-Drawing Pots, and we do hereby declare the following to be a full, clear, and exact description of the invention, such as will enable others skilled in the art to which it appertains to make and use the same.

The invention relates to glass drawing pots.

The object of the present invention is to improve the construction of glass drawing pots and to provide a simple, practical and efficient glass drawing pot of comparatively inexpensive construction adapted to increase the production and capable of enabling the revoluble drawing pot to be supplied with better glass from the tank of a glass furnace without lowering the temperature, thereby effecting a saving in fuel.

A further object of the invention is to provide means for enabling the drawing pot to be supplied with glass without ladling the same from the tank to the pot, whereby the temperature will not only be maintained uniform, but a saving in labor incident to the dispensing with the ladling will be effected.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a fragmentary vertical sectional view of a glass furnace illustrating the application of the pot.

Fig. 2 is a plan view of the pot.

Fig. 3 is a sectional view on the line 3—3 of Fig. 2, illustrating the construction of the pot and the passages thereof.

Fig. 4 is a detail view of the feed tube or member.

Like numerals of reference designate corresponding parts in the several figures of the drawings.

In the accompanying drawings, in which is illustrated the preferred embodiment of the invention, 1 designates a glass furnace of the usual construction equipped with a revoluble reversible drawing pot designed to be constructed of fire clay or other suitable refractory material, and provided with inner and outer trunnions 3 and 4 mounted in suitable bearings, the trunnion 4 being round and the trunnion 3 being polygonal and receiving a worm wheel 5 which has its hub portion journaled in the bearing for the outer trunnion 3. By this construction the worm wheel is interlocked with the pot 2 and is adapted to rotate the same.

The trunnion 4 is provided with an extension 6 having a rounded terminal portion 7 to fit in a concavity 8 of a feed tube or member 9 provided with a longitudinal passage 10 with which passages 11 of the inner trunnion of the glass pot are adapted to register. The passages 11 extend to the center of the pot and communicate with each of the compartments or portions thereof. When the pot is in one of its positions, one of the passages 11 registers with the passage 10 and when the pot is reversed the other passage 11 is carried into register with the said passage 10. The passages 10 and 11 form glass inlets and the passage 10, which communicates with the glass tank of the glass furnace, is adapted to permit the glass to flow into the pot for feeding the same, whereby the glass is supplied to the pot without ladling and without lowering the temperature of the furnace, thereby enabling the operation of blowing glass cylinders to be effected with less fuel and less labor and with better glass. Also the rapidity of the operation is correspondingly increased. The flow of glass to the pot is automatically cut off by the carrying of the passages 11 out of register with the passage 10 when the glass pot is revolved to reverse it. The feeding member 9 is designed to be equipped with a suitable valve or gate 12 to enable the passage 10 to be closed when desired. In practice the glass furnace will be provided with a sectional top adapted to be moved slightly to either side to provide the necessary space when the pot is revolved.

The machine is equipped with a blow pipe 18 of the ordinary construction carried by a frame 18' and provided with the usual bait 19.

What is claimed is:

1. In a glass blowing machine, the combination with a furnace having a glass supply conduit, of a revoluble pot having a plurality of glass receptacles and provided with a trunnion having separate passages connected with the said receptacle and arranged to be carried into register with the conduit of the furnace by the rotary movement of the pot.

2. The combination of a glass furnace having a glass supply conduit, and a revoluble pot having a plurality of glass receptacles and provided with a trunnion having a plurality of separate passages communicating with the receptacles of the pot, said trunnion having an interfitting connection with the conduit, and the passages being arranged to be carried successively into register with the conduit by the rotary movement of the pot.

3. The combination of a glass furnace having a glass supply conduit provided with an eccentrically arranged passage and having a socket at the outer end, and a revoluble pot provided with a plurality of glass receptacles and having a trunnion provided with separate eccentrically arranged longitudinal passages communicating with the glass receptacles of the pot, said trunnion having an extension fitting in the socket of the conduit, the passages of the trunnion being adapted to be carried successively into register with the passage of the conduit by the rotary movement of the pot.

In testimony whereof I affix my signature in presence of two witnesses.

STANLEY MEREDITH.

Witnesses:
  Roy T. Clopp,
  L. Bain.

In testimony whereof I affix my signature in presence of two witnesses.

CLIFFORD W. HOLLAND.

Witnesses:
  Earl V. Baum,
  Adam B. Muffer.

In testimony whereof I affix my signature in presence of two witnesses.

LOUIS J. O'BRIEN.

Witnesses:
  Park Haws,
  C. W. F. Woshalder.

In testimony whereof I affix my signature in presence of two witnesses.

CHARLES C. McHENRY.

Witnesses:
  Earl V. Baum,
  Adam B. Muffer.